(12) United States Patent
Pandey et al.

(10) Patent No.: US 12,190,067 B2
(45) Date of Patent: Jan. 7, 2025

(54) CONTEXT-BASED RESPONSE GENERATION

(71) Applicant: International Business Machines Corporation, Armonk, NY (US)

(72) Inventors: Gaurav Pandey, New Delhi (IN); Danish Contractor, Haryana (IN); Nathaniel Mills, Coventry, CT (US); Jatin Ganhotra, White Plains, NY (US); Ross Warren Judd, Beacon Hill (AU); Sachindra Joshi, Gurgaon (IN); Luis A. Lastras-Montano, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 17/675,078

(22) Filed: Feb. 18, 2022

(65) Prior Publication Data

US 2023/0267278 A1 Aug. 24, 2023

(51) Int. Cl.
*G06F 40/35* (2020.01)
*G06F 40/20* (2020.01)
*G06N 20/20* (2019.01)

(52) U.S. Cl.
CPC .............. *G06F 40/35* (2020.01); *G06F 40/20* (2020.01); *G06N 20/20* (2019.01)

(58) Field of Classification Search
CPC .......... G06F 40/00; G06F 40/20; G06F 40/35; G06N 20/00; G06N 20/20
See application file for complete search history.

(56) References Cited

U.S. PATENT DOCUMENTS 9,805,371 B1 10/2017 Sapoznik et al.
11,076,047 B1 7/2021 Clodore et al.
(Continued)

OTHER PUBLICATIONS

Song, Yiping, et al. "An Ensemble of Retrieval-Based and Generation-Based Human-Computer Conversation Systems," Proceedings of the 27th International Joint Conference on Artificial Intelligence Jul. 13, 2018, pp. 4382-4388.
(Continued)

*Primary Examiner* — Daniel C Washburn
*Assistant Examiner* — Sean E Serraguard
(74) *Attorney, Agent, or Firm* — Ryan, Mason & Lewis, LLP (57) ABSTRACT

Methods, systems, and computer program products for context-based response generation are provided herein. A method includes: obtaining conversation logs comprising agent responses matched to contexts and a set of designated responses that are not matched to the contexts; replacing at least a portion of the agent responses with the designated responses to form modified conversation logs; training a first model, using the modified conversation logs, to output a designated response in the set for a given context and a second model, using the historical conversation logs, to output one of the agent responses for a given context; identifying one or more new responses based at least in part on the output of the second machine learning model for a particular one of the contexts; and retraining the first machine learning model based at least in part on the one or more new responses.

20 Claims, 7 Drawing Sheets

(56) References Cited

U.S. PATENT DOCUMENTS

| | | | |
|---|---|---|---|
| 2009/0245500 A1* | 10/2009 | Wampler | H04M 7/006 |
| | | | 379/265.09 |
| 2019/0251165 A1* | 8/2019 | Bachrach | G06N 3/084 |
| 2020/0097544 A1* | 3/2020 | Alexander | G06F 40/35 |
| 2020/0159827 A1 | 5/2020 | Vozila et al. | |
| 2021/0126881 A1 | 4/2021 | Ball et al. | |
| 2022/0004702 A1* | 1/2022 | Liang | G10L 15/183 |
| 2022/0050971 A1* | 2/2022 | Liu | G06N 7/01 |
| 2022/0108080 A1* | 4/2022 | Munavalli | G06N 3/08 |
| 2022/0335223 A1* | 10/2022 | Tripathi | G06F 40/35 |

OTHER PUBLICATIONS

Wu, Yu, et al. "Response generation by context-aware prototype editing," Proceedings of the AAAI Conference on Artificial Intelligence, Jul. 17, 2019, vol. 33, No. 01, pp. 7281-7288.

* cited by examiner

CONTEXT-BASED RESPONSE GENERATION

BACKGROUND

The present application generally relates to information technology and, more particularly, to communication processing.

Conversation systems having virtual and/or human agents are increasingly being used to communicate with users. In a customer support context, for example, such agents often engage in conversations with customers to resolve issues related to products or services.

SUMMARY

In one embodiment of the present disclosure, techniques for context-based response generation in a dialogue system are provided. An exemplary computer-implemented method includes: obtaining (i) one or more historical conversation logs comprising a plurality of agent responses matched to a plurality of conversation contexts and (ii) a set of designated responses that are not matched to the plurality of conversation contexts; replacing at least a portion of the plurality of agent responses with the designated responses in the set, thereby forming one or more modified conversation logs; training (i) a first machine learning model, using the one or more modified conversation logs, to output one of the designated responses in the set for a given one of the conversation contexts and (ii) a second machine learning model, using the one or more historical conversation logs, to output one of the agent responses for a given conversation context; in response to determining that the trained first machine learning model does not output one of the designated responses in the set for a particular one of the plurality conversation contexts, identifying one or more new responses based at least in part on the output of the second machine learning model for the particular conversation context; and retraining the first machine learning model based at least in part on the one or more new responses.

Another embodiment of the present disclosure or elements thereof can be implemented in the form of a computer program product tangibly embodying computer readable instructions which, when implemented, cause a computer to carry out a plurality of method steps, as described herein. Furthermore, another embodiment of the present disclosure or elements thereof can be implemented in the form of a system including a memory and at least one processor that is coupled to the memory and configured to perform noted method steps. Yet further, another embodiment of the present disclosure or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present disclosure will become apparent from the following detailed description of illustrative embodiments thereof, which is to be read in connection with the accompanying drawings.

DETAILED DESCRIPTION

It is important for agents (e.g., virtual, or human agents) to provide consistent and professional responses when engaging with customers. To accomplish this, businesses often hire expert consultants to prepare a list of designated responses to be used by the agents. However, using the designated responses can be difficult in a real-world setting. For example, discovering and selecting a designated response can be difficult as it may require multiple user interfaces and/or steps. Also, the list of designated responses generally cannot cover every situation, or there may be some overlap within the list. This can make it difficult to determine which, if any, designated response should be used. Also, the list of designated responses needs to be updated periodically, thereby resulting in increased costs to the business.

The term "designated response" as used herein is intended to be broadly construed so as to encompass, for example, responses that are preferred to be used in the conversation system. For example, a designated response may include a response that has been approved, authorized, and/or curated for a particular context.

As described herein, illustrative embodiments described herein include a process for managing the life cycle of designated responses in a conversation system. In some embodiments, an iterative method is performed to discover additional or new designated responses that utilize a first machine learning model to predict responses from conversation logs, and a second machine learning model to identify a designated response for a given context. Such embodiments can also incorporate feedback (e.g., from a user of the conversation system) to improve the predictions. One or more embodiments can recommend designated responses from unpaired conversation logs and bootstrap the discovery of additional designated responses using clustering and filtering techniques.

Figure 1:
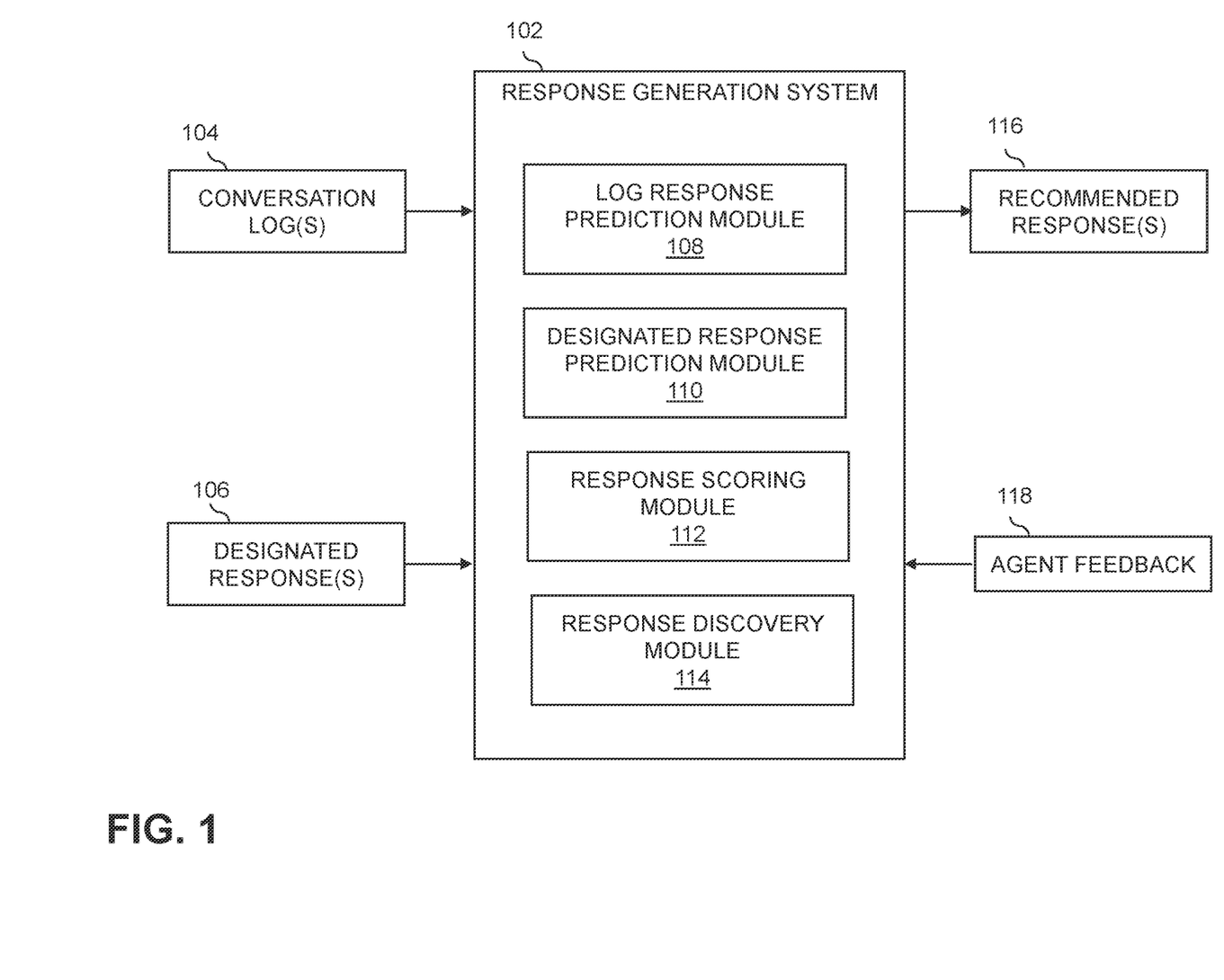
FIG. 1 is a diagram illustrating a system architecture for context-based response generation in accordance with exemplary embodiments.

FIG. 1 is a diagram illustrating a system architecture for context-based response generation in accordance with exemplary embodiments. By way of illustration, FIG. 1 depicts a response generation system 102 that includes a log response prediction module 108, designated response prediction module 110, response scoring module 112, and a response discovery module 114.

The response generation system 102 obtains input in the form of one or more conversation logs 104 and one or more designated responses 106, and uses a machine learning process 116 to generate one or more recommended responses 116. In more detail, the log response prediction module 108 builds a first machine learning model that learns to generate responses based on the one or more conversation logs 104. The designated response prediction module 110 builds a second machine learning model that learns to output one of the designated responses 106 for a given conversation context.

The response scoring module 112 generates a common scoring model using data from the conversations logs 104. The same model parameters of the common scoring model are used to score responses output by the first and second machine learning models.

The recommended responses 116 that are output can be based at least in part on such scores. One example of a process for training the first and second machine learning models is described in more detail in conjunction with FIG. 2.

The response discovery module 114 identifies new designated responses that can be added to the set of designated responses 106. One example of a process that can be utilized by the response discovery module 114 is described in more detail in conjunction with FIG. 3. Also, agent feedback 118 can be provided to validate the recommended responses 116, as described in more detail elsewhere herein.

Figure 2:
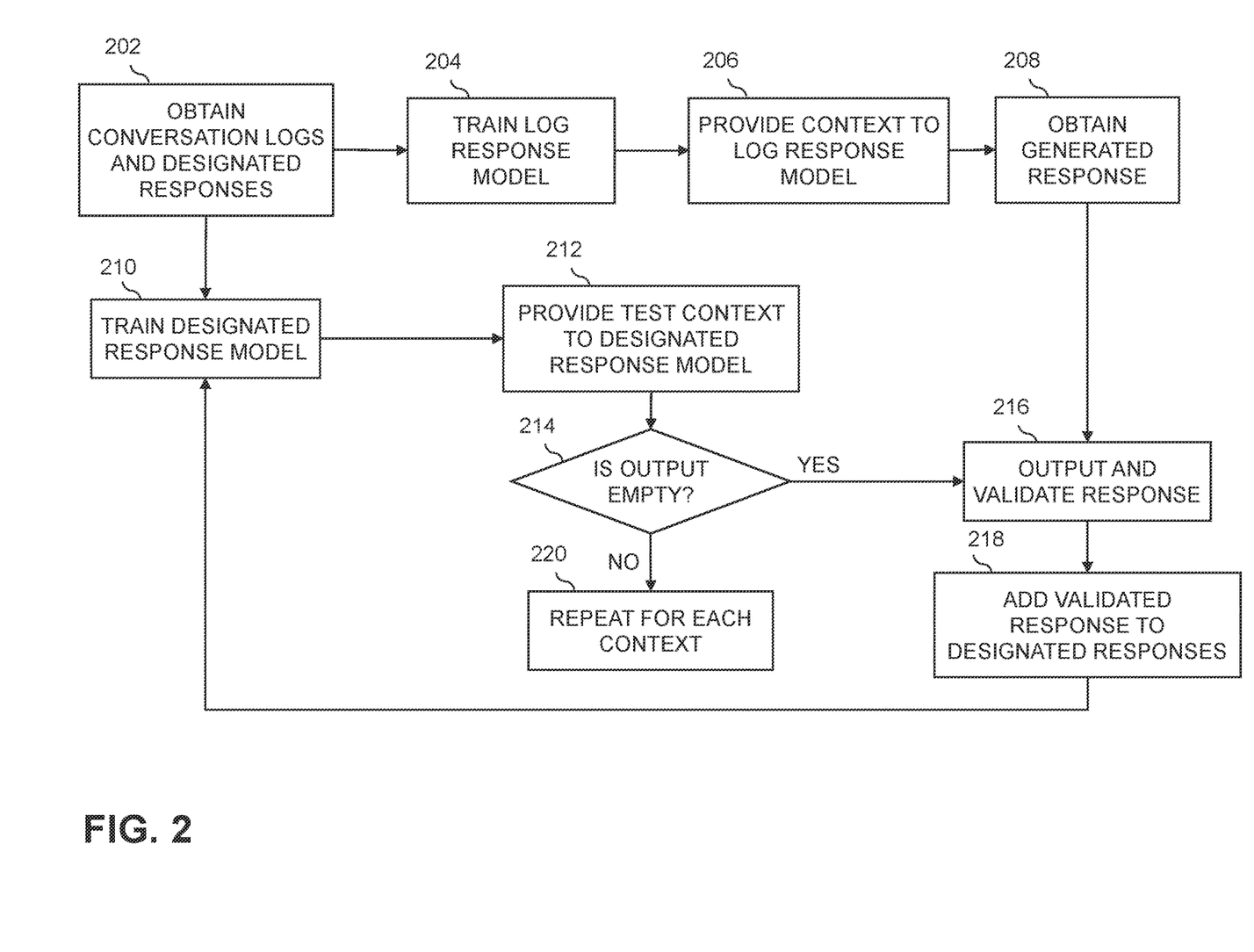
FIG. 2 is a diagram illustrating a machine learning training process in accordance with exemplary embodiments.

FIG. 2 is a diagram illustrating a machine learning training process in accordance with exemplary embodiments. Step 202 includes obtaining a set of conversation logs and a set of designated responses. Step 204 includes training a log response model that learns to generate responses based on the obtained conversation logs. Step 206 includes providing a given context to the trained log response model, and step 208 include obtaining a generated response that is output by the trained log response model.

Step 210 includes training a designated response model using both the conversation logs and the designated responses obtained at step 202. In some embodiments, step 210 includes matching the designated responses with responses in the conversation logs. A non-limiting example of a process to match the designated responses is as follows:
1) Sort the designated responses by length;
2) For each designated response: (i) select responses in the conversation logs that are within a certain threshold of the designated response, and (ii) if the list of selected responses is non-empty, then add the list of selected responses to a list associated with the designated response; and
3) Replace the responses in the conversation logs with the designated responses based on the results of step 2.

The matching process results in a subset of the conversation logs where the actual responses have been replaced by the corresponding designated responses.

When training the designated response model, it is assumed that each designated response is already paired with an intent. As an example, the designated response, "I have processed a payment extension for you until ~date~," can be paired with the following intent: "payment extension_processed." The designated response model, in some embodiments, can correspond to an encoder-decoder framework that is trained to generate the intent of the designated response for a given context that replaced the actual responses in step 3 of the matching process above. As an example, the encoder-decoder frameworks can correspond to a Seq2Seq, transformer, and/or pretrained language models (e.g., GPT-2, Longformer Encoder-Decoder). The networks can be trained in an end-to-end manner. The same network architecture can be used to train the log response model in step 204, for example.

By way of example, the encoder may obtain the following dialog context: "User: I need more time to pay my bills. Agent: When will you be able to pay the bill. User: Next week," and the decoder may output: (i) the following designated response intent of the matched response: "payment extension_processed," and (ii) the following agent response from the conversation logs: "I have processed a payment extension for you until ~date~."

Step 212 is performed after the designated response model has been trained, and includes providing a test context to the trained designated response model. Step 214 performs a test to determine whether the output is empty. If yes, then the process continues to step 216, which includes validating one or more of responses obtained at step 208. By way of example, one or more responses generated by the trained log response model can be output to an agent (e.g., a subject matter expert), and the responses can be validated based on feedback provided by the agent. In some examples, the feedback can include one or more edits or a selection of a particular response.

Step 218 include adding the validated response(s) from step 216 to the list of designated responses obtained at step 202. The process then returns to step 210 to re-train the designated response model using the updated list of designated responses.

If the result of step 214 is no, then the context is already covered by one or more of the designated responses, and step 220 repeats the process for each context.

In at least some embodiments, a common scoring model is trained (e.g., by the response scoring module 112). For example, given a particular dialog context, a number of sample responses can be provided to the log response model trained at step 204. The common scoring model can score the sample response. Generally, the common scoring model is trained to predict the matched designated responses (from matching process described above) as well as agent responses from the conversation logs obtained at step 202. More specifically, for a given context, the common scoring model is trained to assign high scores to ground-truth responses or the matched designated responses during training, and to assign low scores to any other response.

The common scoring model, in some embodiments, may correspond to a joint encoder framework that obtains a context and a response as input and outputs a score. For example, assume the following designated response, "I have processed a payment extension for you until ~date~," was output by the designated response model when given the following context as input, "User: I need more time to pay my bills. Agent: When will you be able to pay the bill. User: Next week." If this designated response was matched to the context during training, then the output of the common scoring model is a high score (e.g., "1"). On the other hand, if the designated response model was provided the same context and output an unmatched response (e.g., "What is the color of the lights on your modem?" then the output of the common scoring model is a low score (e.g., "0").

In some embodiments, the common scoring model can be used to determine which response to output for validation at step 216 of the process in FIG. 2. For example, if the output is empty at step 214, then the highest scoring response from the log response model can be output at step 216 for validation.

The common scoring model can also be used in a continuous learning and improvement process. For example, the common scoring model can score the designated responses, and the top-k responses can be presented to the agent. The agent can choose to accept or ignore the responses before sending it to the client in a real-time conversation, for example. This information (e.g., the selection of the agent) is used to finetune the model. In more detail, when a response is accepted, a reward can be associated with the response (e.g., "+1"), otherwise a penalty is associated with the response (e.g., "−1"). The common scoring model can be trained to assign a higher score to accepted responses, that is, maximize $\Sigma_i$ reward(i)×score(response$_i$).

Figure 3:
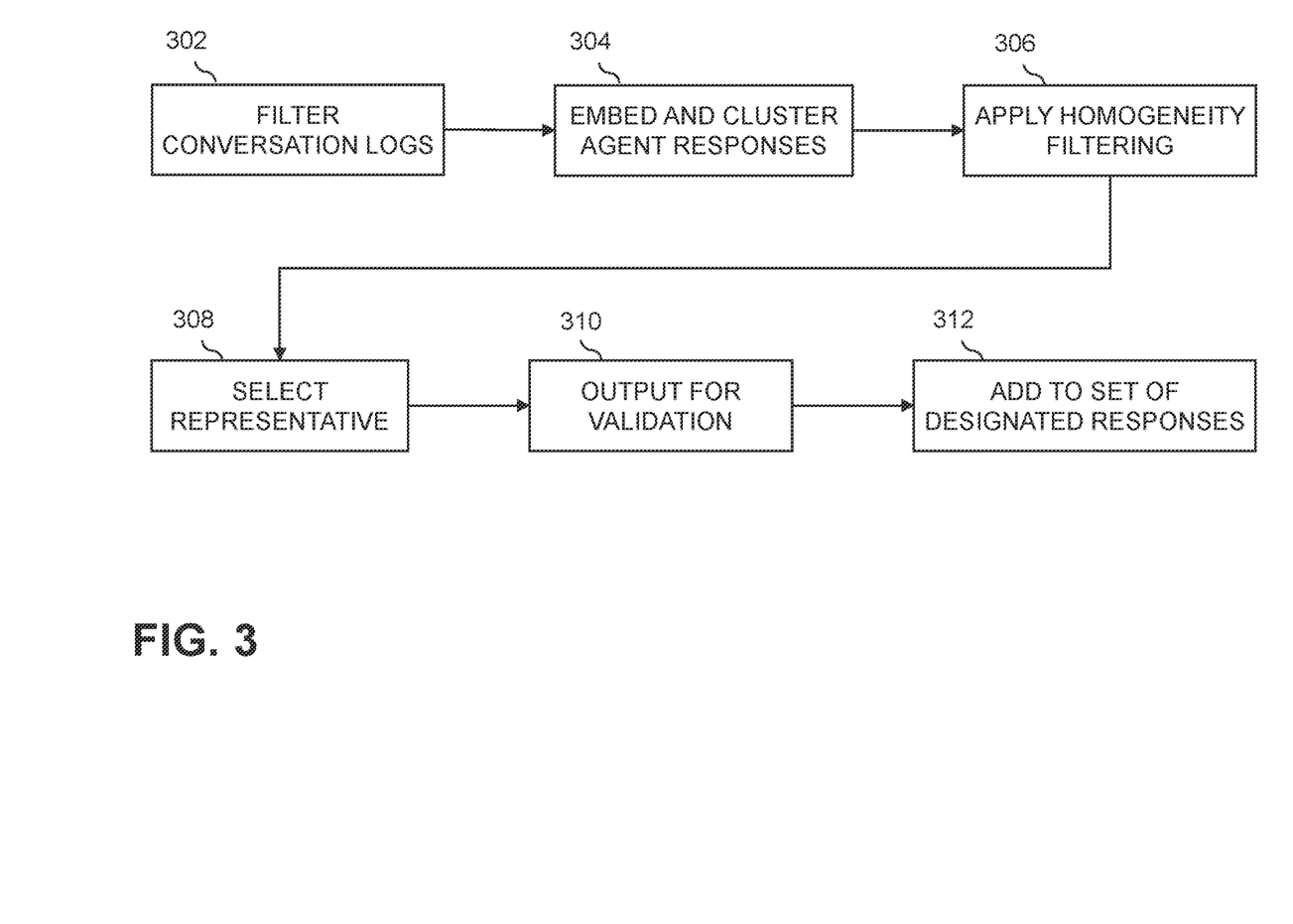
FIG. 3 is a diagram illustrating a response discover process in accordance with exemplary embodiments.

Referring now to FIG. 3, this figure shows a response discovery process in accordance with exemplary embodiments. Step 302 includes filtering conversation logs (e.g., conversation logs 104) to identify the contexts and the agent responses. In some examples, the filtering in step 302 may include:
1) Identifying agent responses in the conversation logs;
2) Splitting each agent response into individual sentences and adding those sentences to a global list; and
3) Removing all duplicate sentences from the global list.

Step 304 includes embedding and clustering the agent responses. Generally, step 304 can include obtaining a set of agent responses as input and outputting a set of response clusters. For example, the agent responses can be encoded to generate response embeddings (e.g., using for example an embedding architecture such as Doc2Vec, Universal Sentence Embeddings, BERT embeddings). A clustering algorithm (such as, e.g., k-means, agglomerative clustering, or curriculum clustering) is applied on the embeddings. The number of clusters can be fixed in advance or determined as part of the clustering algorithm (e.g., in curriculum clustering example).

Step 306 includes applying homogeneity filtering to the clusters. In some embodiment, the homogeneity of a cluster can be defined based on at least one of following: (i) average distance of the points in a cluster from its centroid (variance); (ii) volume of the polyhedron encompassed by the points in the cluster; and (iii) entropy of the cluster distribution. Step 306 can include fixing a threshold for the homogeneity measure and filtering all of the clusters with homogeneity below the threshold. Step 308 includes selecting a representative. The representative for a given a response cluster can be selected, for example, by: computing the centroid of the response embeddings, selecting the response in the cluster closest to the centroid; addressing grammar and misspellings in the selected response to create the representative response. Step 310 includes outputting the representative for validation to a user. If validated, step 312 includes adding the representative to the set of designated responses.

Once the set of designated responses has been generated, the conversation logs can be analyzed to determine all the contexts where existing/proposed designated responses are applicable to report coverage and whitespace.

In some embodiments, the context-based response generation techniques can be implemented as a tool (e.g., a software widget) of a conversation system. As an example, the widget can analyze conversations in substantially real time to identify a context, and then automatically suggest a recommended response for the context to the agent.

Figure 4:
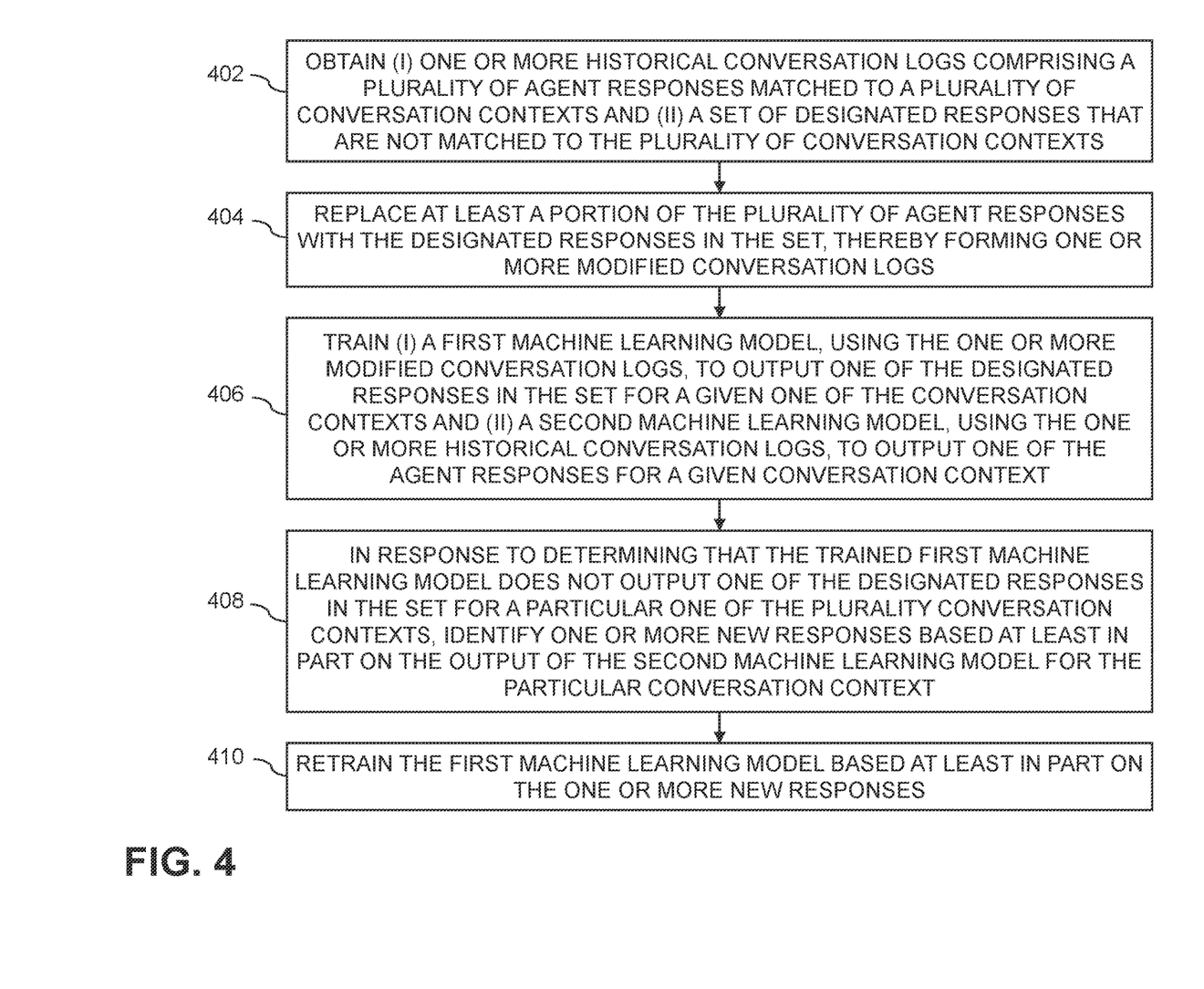
FIG. 4 is a flow diagram illustrating techniques for context-based response generation in accordance with exemplary embodiments.

FIG. 4 is a flow diagram for a context-based response generation process in accordance with exemplary embodiments. It is assumed the process depicted in FIG. 4 is performed at least in part by the response generation system 102.

Step 402 includes obtaining (i) one or more historical conversation logs comprising a plurality of agent responses matched to a plurality of conversation contexts and (ii) a set of designated responses that are not matched to the plurality of conversation contexts. Step 404 includes replacing at least a portion of the plurality of agent responses with the designated responses in the set, thereby forming one or more modified conversation logs. Step 406 includes training (i) a first machine learning model, using the one or more modified conversation logs, to output one of the designated responses in the set for a given one of the conversation contexts and (ii) a second machine learning model, using the one or more historical conversation logs, to output one of the agent responses for a given conversation context. Step 408 includes in response to determining that the trained first machine learning model does not output one of the designated responses in the set for a particular one of the plurality conversation contexts, identifying one or more new responses based at least in part on the output of the second machine learning model for the particular conversation context. Step 410 includes retraining the first machine learning model based at least in part on the one or more new responses.

The process may include a step of training a common scoring model that assigns a score to each of the outputs of the first and second machine learning models. The common scoring model may be trained using the historical training logs and may assign: a high score in response to at least one of: (i) an input-output pair of the first machine learning model matching a conversation context-designated response pair from the one or more modified conversation logs, and (ii) an input-output pair of the second machine learning model matching a conversation context-agent response pair from the one or more historical conversation logs; and a low score for all other outputs of the first and second machine learning models. The identifying may include: using the common scoring model to assign scores to agent responses that are output by the second machine learning model for the particular conversation context; and recommending at least one of the agent responses to a user based on the assigned scores. The one or more new responses may include one of the recommended agent responses validated by the user in response to the recommending. Training the common scoring model may include: using the common scoring model to assign scores to multiple designated responses output by the first machine learning model; providing, based on the assigned scores, at least one of the multiple designated responses to a user; and finetuning the common scoring model in response to the user selecting one of the provided designated responses. The process may further include the following steps: generating response embeddings for at least a portion of the agent responses; clustering the response embeddings into a plurality of clusters; applying a homogeneity filtering process to each of the plurality of cluster; generating one or more synthetic responses based at least in part on the filtered clusters; and adding the one or more synthetic responses to the set of designated responses in response to a user validating the one or more synthetic responses. The one or more synthetic responses may be generated based on a centroid computed for at least one of the filtered clusters. At least one of the first machine learning model and the second machine learning model may be trained using an encoder-decoder architecture. The process may include a step of deploying at least the first machine learning model in a conversation system that outputs designated responses from the set during a real-time conversation between an agent and a user.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the present disclosure, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the present disclosure, the computer program product can include computer useable program code that is stored in a computer readable storage medium in a server data processing system, and wherein the computer useable program code is downloaded over a network to a remote data processing system for use in a computer readable storage medium with the remote system.

An exemplary embodiment or elements thereof can be implemented in the form of an apparatus including a memory and at least one processor that is coupled to the memory and configured to perform exemplary method steps.

Figure 5:
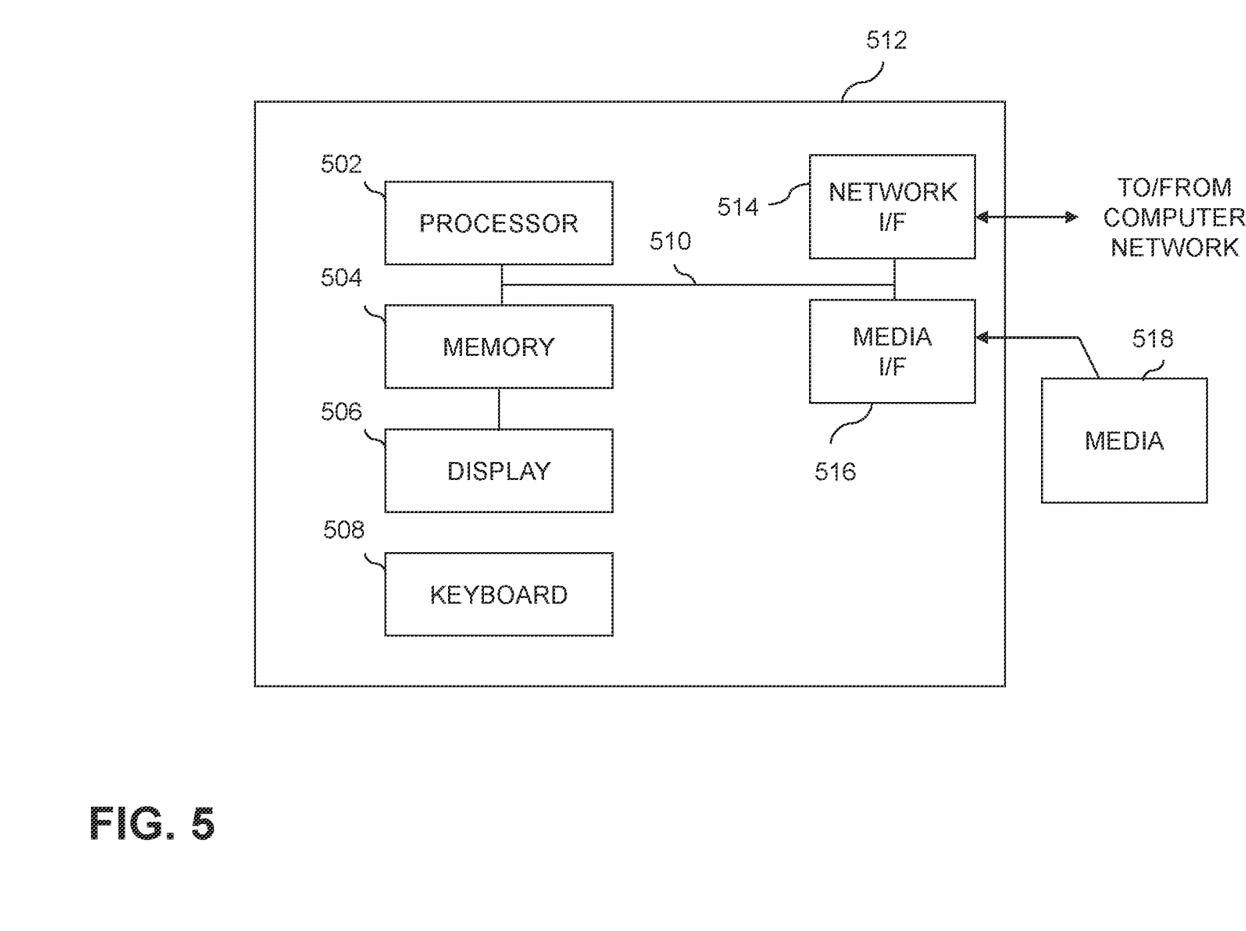
FIG. 5 is a system diagram of an exemplary computer system on which at least one embodiment of the present disclosure can be implemented.

Additionally, an embodiment of the present disclosure can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the present disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

An exemplary embodiment may include a system, a method, and/or a computer program product at any possible technical detail level of integration. The computer program product may include a computer readable storage medium (or media) having computer readable program instructions thereon for causing a processor to carry out exemplary embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present disclosure.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings provided herein, one of ordinary skill in the related art will be able to contemplate other implementations of the components.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
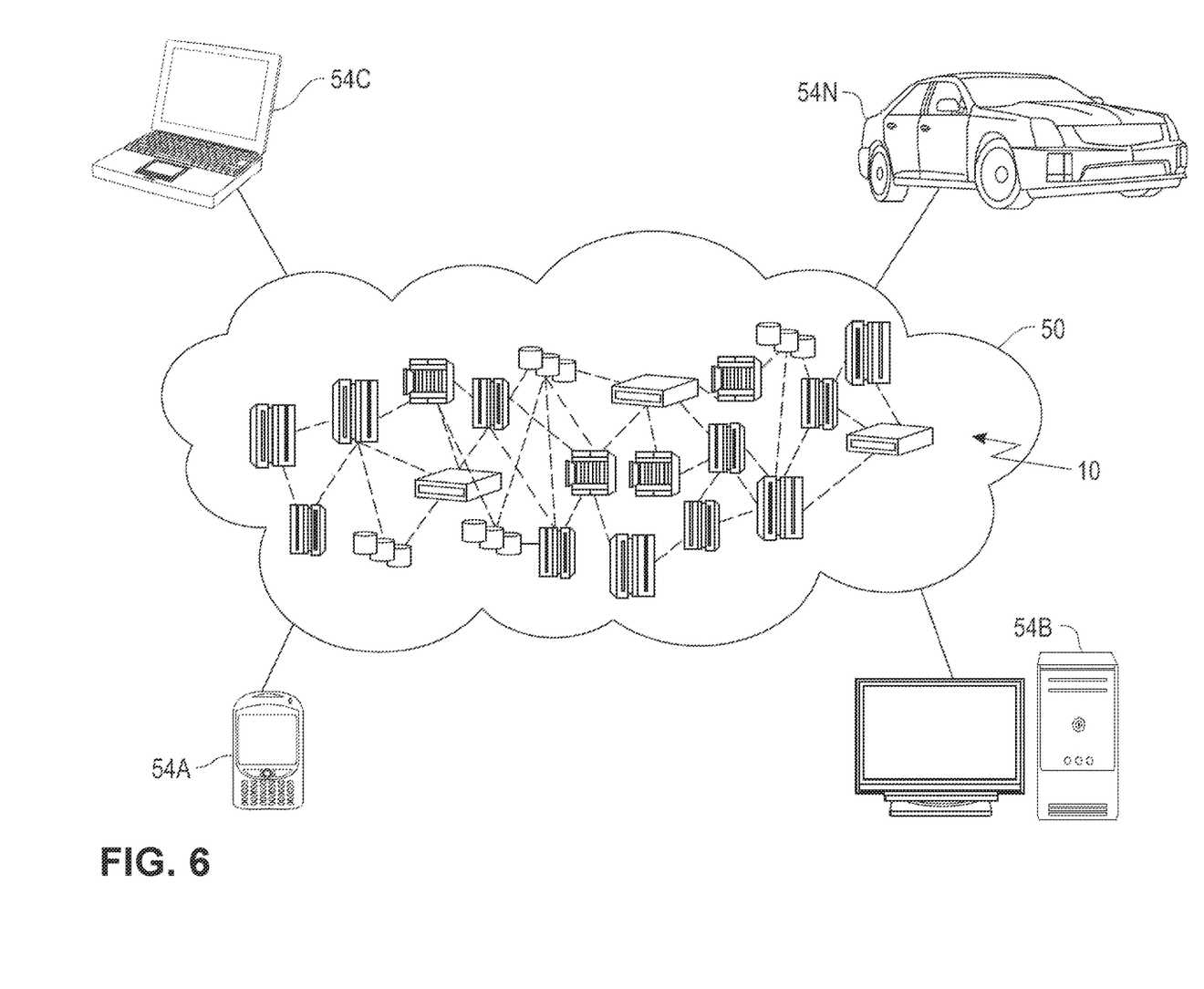
FIG. 6 depicts a cloud computing environment in accordance with exemplary embodiments.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
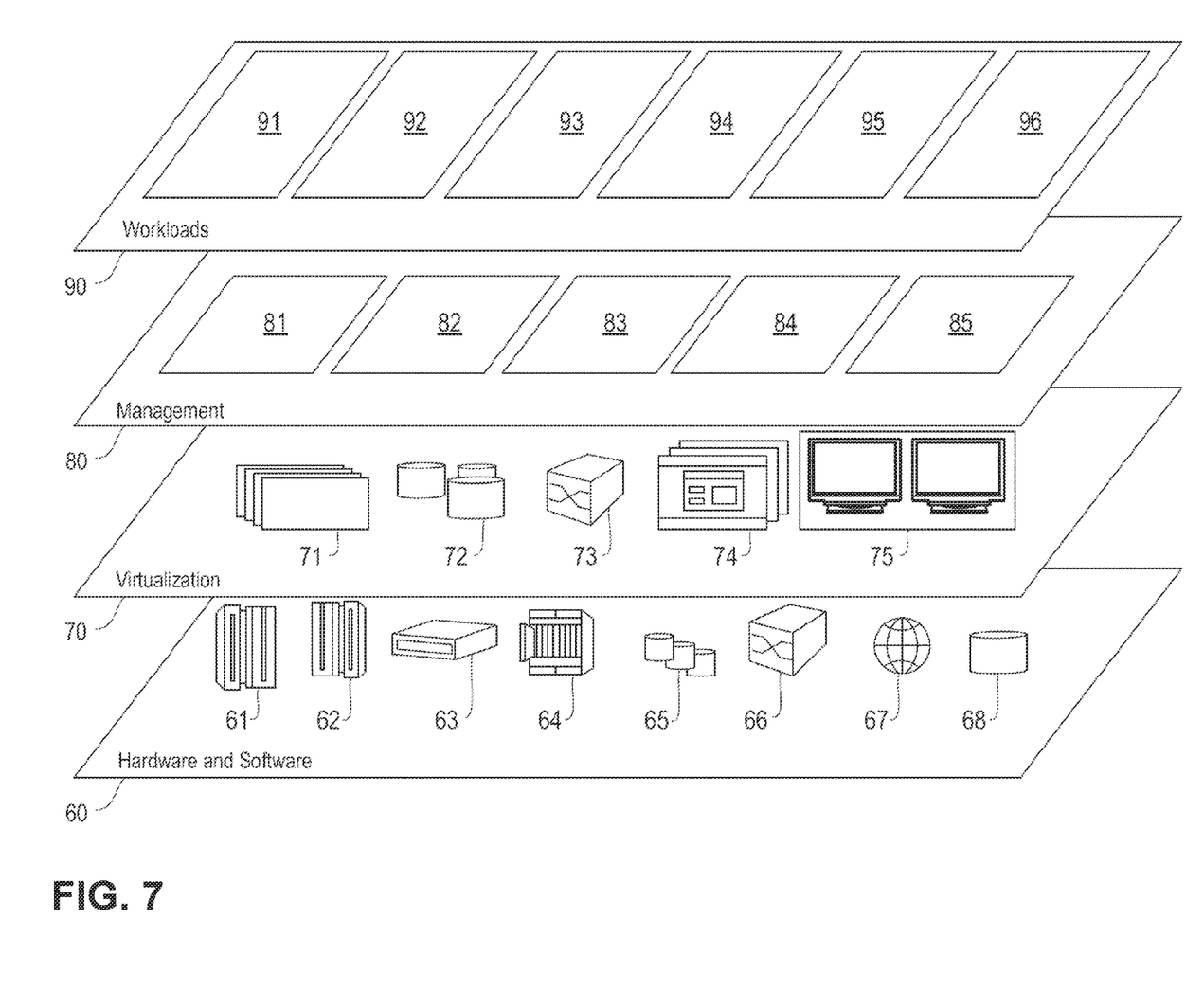
FIG. 7 depicts abstraction model layers in accordance with exemplary embodiments.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and context-based response generation 96, in accordance with the one or more embodiments of the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

Some embodiments of the present disclosure may provide one or beneficial effects such as, for example, automatically generating context-based responses in a conversation system and improve discoverability and coverage of designated responses based on an analysis of conversation history. Also, recommendations can improve over time based on implicit feedback (e.g., agent selections of responses and/or edits to such responses). New responses can be automatically detected and/or generated. Some embodiments can also improve response consistency and agent productivity, while reducing the overall costs that are typically associated with obtaining and implementing such responses.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
   obtaining one or more historical conversation logs comprising a plurality of agent responses matched to a plurality of conversation contexts and a set of designated responses that are not matched to the plurality of conversation contexts;
   replacing at least a portion of the plurality of agent responses with the designated responses in the set, thereby forming one or more modified conversation logs;
   training (i) a first machine learning model, using the one or more modified conversation logs, to output respective ones of the designated responses in the set for corresponding text conversation contexts selected from a first portion of the plurality of conversation contexts and (ii) a second machine learning model, using the one or more historical conversation logs, to output respective ones of the agent responses for corresponding ones of the text conversation contexts;
   determining that the trained first machine learning model does not output one of the designated responses in the set for at least one conversation context selected from a second portion of the plurality conversation contexts, wherein the second portion is different from the first portion;
   identifying one or more new responses based at least in part on the output of the second machine learning model for the at least one conversation context selected from the second portion of the plurality of conversation contexts, wherein the identifying comprises selecting the one or more new responses from a plurality of clusters based on a similarity between the output of the second machine learning model for the at least one conversation context and the plurality of clusters; and
   retraining the first machine learning model based at least in part on the one or more new responses;
   wherein the method is carried out by at least one computing device.

2. The computer-implemented method of claim 1, comprising:
   training a common scoring model that assigns a score to each of the outputs of the first and second machine learning models, wherein the common scoring model is trained using the one or more historical conversation logs and assigns:
      a high score in response to at least one of: (i) an input-output pair of the first machine learning model matching a conversation context-designated response pair from the one or more modified conversation logs, and (ii) an input-output pair of the second machine learning model matching a conversation context-agent response pair from the one or more historical conversation logs; and
      a low score for all other outputs of the first and second machine learning models.

3. The computer-implemented method of claim 2, wherein the identifying comprises:
   using the common scoring model to assign scores to the agent responses that are output by the second machine learning model for the at least one conversation context selected from the second portion; and
   recommending at least one of the agent responses to a user based on the assigned scores, wherein the one or more new responses comprises one of the recommended agent responses validated by the user in response to the recommending.

4. The computer-implemented method of claim 2, wherein training the common scoring model comprises:
   using the common scoring model to assign scores to multiple designated responses output by the first machine learning model;
   providing, based on the assigned scores, at least one of the multiple designated responses to a user; and
   finetuning the common scoring model in response to the user selecting one of the provided designated responses.

5. The computer-implemented method of claim 1, comprising:
   generating the plurality of clusters, wherein the generating comprises:
      generating response embeddings for at least a portion of the agent responses; and
      clustering the response embeddings into the plurality of clusters.

6. The computer-implemented method of claim 5, further comprising:
applying a homogeneity filtering process to each of the plurality of clusters;
generating one or more synthetic responses based at least in part on the filtered clusters; and
adding the one or more synthetic responses to the set of designated responses in response to a user validating the one or more synthetic responses, wherein the one or more synthetic responses are generated based on a centroid computed for at least one of the filtered clusters.

7. The computer-implemented method of claim 1, wherein at least one of the first machine learning model and the second machine learning model is trained using an encoder-decoder architecture.

8. The computer-implemented method of claim 1, comprising:
deploying at least the first machine learning model in a conversation system that outputs designated responses from the set during a real-time conversation between an agent and a user.

9. The computer-implemented method of claim 1, wherein software is provided as a service in a cloud environment.

10. A computer program product comprising a computer readable storage medium having program instructions embodied therewith, the program instructions executable by a computing device to cause the computing device to:
obtain one or more historical conversation logs comprising a plurality of agent responses matched to a plurality of conversation contexts and a set of designated responses that are not matched to the plurality of conversation contexts;
replace at least a portion of the plurality of agent responses with the designated responses in the set, thereby forming one or more modified conversation logs;
train (i) a first machine learning model, using the one or more modified conversation logs, to output respective ones of the designated responses in the set for corresponding text conversation contexts selected from a first portion of the plurality of conversation contexts and (ii) a second machine learning model, using the one or more historical conversation logs, to output respective ones of the agent responses for corresponding ones of the text conversation contexts;
determine that the trained first machine learning model does not output one of the designated responses in the set for at least one conversation context selected from a second portion of the plurality conversation contexts, wherein the second portion is different from the first portion;
identify one or more new responses based at least in part on the output of the second machine learning model for the at least one conversation context selected from the second portion of the plurality of conversation contexts, wherein the identifying comprises selecting the one or more new responses from a plurality of clusters based on a similarity between the output of the second machine learning model for the at least one conversation context and the plurality of clusters; and
retrain the first machine learning model based at least in part on the one or more new responses.

11. The computer program product of claim 10, wherein the program instructions executable by a computing device further cause the computing device to:
train a common scoring model that assigns a score to each of the outputs of the first and second machine learning models, wherein the common scoring model is trained using the one or more historical conversation logs and assigns:
a high score in response to at least one of: (i) an input-output pair of the first machine learning model matching a conversation context-designated response pair from the one or more modified conversation logs, and (ii) an input-output pair of the second machine learning model matching a conversation context-agent response pair from the one or more historical conversation logs; and
a low score for all other outputs of the first and second machine learning models.

12. The computer program product of claim 11, wherein the identifying comprises:
using the common scoring model to assign scores to the agent responses that are output by the second machine learning model for the at least one conversation context selected from the second portion; and
recommending at least one of the agent responses to a user based on the assigned scores, wherein the one or more new responses comprises one of the recommended agent responses validated by the user in response to the recommending.

13. The computer program product of claim 12, wherein training the common scoring model comprises:
using the common scoring model to assign scores to multiple designated responses output by the first machine learning model;
providing, based on the assigned scores, at least one of the multiple designated responses to a user; and
finetuning the common scoring model in response to the user selecting one of the provided designated responses.

14. The computer program product of claim 10, wherein the program instructions executable by a computing device further cause the computing device to:
generate the plurality of clusters, wherein the generating comprises:
generating response embeddings for at least a portion of the agent responses; and
cluster the response embeddings into a plurality of clusters.

15. The computer program product of claim 14, wherein the program instructions executable by a computing device further cause the computing device to:
apply a homogeneity filtering process to each of the plurality of clusters;
generate one or more synthetic responses based at least in part on the filtered clusters; and
add the one or more synthetic responses to the set of designated responses in response to a user validating the one or more synthetic responses, wherein the one or more synthetic responses are generated based on a centroid computed for at least one of the filtered clusters.

16. The computer program product of claim 10, wherein at least one of the first machine learning model and the second machine learning model is trained using an encoder-decoder architecture.

17. The computer program product of claim 10, wherein the program instructions executable by a computing device further cause the computing device to:

deploy at least the first machine learning model in a conversation system that outputs designated responses from the set during a real-time conversation between an agent and a user.

18. A system comprising:

a memory configured to store program instructions;

a processor operatively coupled to the memory to execute the program instructions to:

obtain one or more historical conversation logs comprising a plurality of agent responses matched to a plurality of conversation contexts and a set of designated responses that are not matched to the plurality of conversation contexts;

replace at least a portion of the plurality of agent responses with the designated responses in the set, thereby forming one or more modified conversation logs;

train (i) a first machine learning model, using the one or more modified conversation logs, to output respective ones of the designated responses in the set for corresponding text conversation contexts selected from a first portion of the plurality of conversation contexts and (ii) a second machine learning model, using the one or more historical conversation logs, to output respective ones of the agent responses for corresponding ones of the text conversation contexts;

determine that the trained first machine learning model does not output one of the designated responses in the set for at least one conversation context selected from a second portion of the plurality conversation contexts, wherein the second portion is different from the first portion;

identify one or more new responses based at least in part on the output of the second machine learning model for the at least one conversation context selected from the second portion of the plurality of conversation contexts, wherein the identifying comprises selecting the one or more new responses from a plurality of clusters based on a similarity between the output of the second machine learning model for the at least one conversation context and the plurality of clusters; and retrain the first machine learning model based at least in part on the one or more new responses.

19. The system of claim 18, wherein the processor is operatively coupled to the memory to execute the program instructions to:

train a common scoring model that assigns a score to each of the outputs of the first and second machine learning models, wherein the common scoring model is trained using the one or more historical conversation logs and assigns:

a high score in response to at least one of: (i) an input-output pair of the first machine learning model matching a conversation context-designated response pair from the one or more modified conversation logs, and (ii) an input-output pair of the second machine learning model matching a conversation context-agent response pair from the one or more historical conversation logs; and a low score for all other outputs of the first and second machine learning models.

20. The system of claim 19, wherein the identifying comprises:

using the common scoring model to assign scores to the agent responses that are output by the second machine learning model for the at least one conversation context selected from the second portion; and recommending at least one of the agent responses to a user based on the assigned scores, wherein the one or more new responses comprises one of the recommended agent responses validated by the user in response to the recommending.

\* \* \* \* \*